(12) United States Patent
Hatanaka

(10) Patent No.: US 6,785,657 B2
(45) Date of Patent: Aug. 31, 2004

(54) DIGITAL SIGNAL PROCESSOR

(75) Inventor: Norio Hatanaka, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 543 days.

(21) Appl. No.: 09/725,000

(22) Filed: Nov. 29, 2000

(65) Prior Publication Data
US 2001/0018657 A1 Aug. 30, 2001

(30) Foreign Application Priority Data
Nov. 29, 1999  (JP) ............................................. 11-338542

(51) Int. Cl.$^7$ ........................ G10L 21/04; G10L 21/00
(52) U.S. Cl. ........................ 704/503; 704/500; 381/107; 455/560
(58) Field of Search ........................... 327/309; 330/51; 340/2.2; 358/426.04; 381/107; 455/560; 704/211, 215, 219, 500, 503

(56) References Cited

U.S. PATENT DOCUMENTS

| 5,784,572 | A | 7/1998 | Rostoker et al. |
| 5,915,066 | A | 6/1999 | Katayama |
| 6,507,611 | B1 | * 1/2003 | Imai et al. ................... 375/222 |
| 2003/0009325 | A1 | * 1/2003 | Kirchherr et al. ........... 704/211 |
| 2003/0125960 | A1 | * 7/2003 | Chu et al. ................... 704/500 |

FOREIGN PATENT DOCUMENTS

| DE | 000762636 A1 | * 12/1993 | ........... H04B/14/04 |
| DE | 000573192 A1 | * 2/1997 | ........... H03G/3/00 |
| JP | 05-114868 | 5/1993 | |
| JP | 05276593 | * 10/1993 | ........... H04R/3/00 |
| JP | 08-287613 | 11/1996 | |

* cited by examiner

Primary Examiner—Richemond Dorvil
Assistant Examiner—V. Paul Harper
(74) Attorney, Agent, or Firm—Wenderoth, Lind & Ponack, L.L.P.

(57) ABSTRACT

A digital signal processor includes a coded audio data generation unit for generating coded audio data; an audio data generation unit for generating audio data; a signal switching unit for outputting one of the coded audio data and the audio data respectively supplied from the coded audio data generation unit and the audio data generation unit, and switching the output between these data; and a signal switching control unit for detecting the periodicity of the coded audio data outputted from the coded audio data generation unit, and controlling the signal switching unit so as to switch the output at the boundary of periods of the coded audio data.

19 Claims, 4 Drawing Sheets

DIGITAL SIGNAL PROCESSOR

FIELD OF THE INVENTION

The present invention relates to a digital signal processor which performs output switching between plural digital audio data and, more particularly, to a digital signal processor employed in a device such as a DVD player or a digital broadcast tuner, which performs output switching between audio data and coded audio data obtained by compressing audio data.

BACKGROUND OF THE INVENTION

With recent developments in multimedia technology, various devices for handling multiple media such as digitized video, audio and data integrally, typified by a DVD player and a set top box for receiving digital TV broadcasts, are becoming widespread.

These devices employ a digital audio interface, popularly called IEC958, for transmitting digital audio data to peripheral devices. This digital audio interface is used not only for transmission of audio data but also for device-to-device transmission of stream data which is compressively encoded according to a standard such as MPEG, DolbyAC-3, DTS, or the like. A DVD player or a digital TV tuner is required to switch the data to be transmitted through the digital audio interface, i.e., to switch its output between the audio data and the stream data.

For example, the DVD player performs output switching between audio data and stream data when there is an instruction from the viewer to switch the audio output from audio data to MPEG stream data of the same content.

Further, in the case where two kinds of digital audio data, such as MPEG stream data (first audio) and audio data coded by linear PCM (second audio), are recorded on the same track of a DVD video disk, the DVD player performs output switching when receiving an instruction from the viewer to switch the output from the first audio to the second audio. To be specific, this corresponds to the situation where the DVD player receives an instruction to switch the data of Japanese as the first audio to the data of another language as the second audio, from the viewer who can watch the DVD video with a variety of languages.

As another example, when the digital TV tuner performs channel switching to select a digital broadcast station, the tuner may switch its output between audio data and stream data.

Hereinafter, a description will be given of a digital signal processor performing output switching between audio data and stream data in a DVD player or a digital TV tuner, with reference to FIGS. 3 to 5.

FIG. 3 is a block diagram illustrating the structure of a conventional digital signal processor.

In FIG. 3, reference numeral 101 denotes a first signal generator which generates stream data 105 according to a standard such as MPEG, DolbyAC-3, DTS, or the like, and transmits the stream data 105 serially; numeral 102 denotes a second signal generator which generates audio data 106, and transmits the audio data 106 serially; numeral 103 denotes a signal switching unit which outputs either the stream data 105 supplied from the first signal generator 101 or the audio data 106 supplied from the second signal generator 102, and switches the output; and numeral 104 denotes a signal switching controller which receives an instruction from the viewer to switch the audio output (hereinafter referred to as "switching instruction"), and outputs an instruction signal 107 for switching (hereinafter, referred to as "switching instruction signal").

FIG. 4 is a diagram illustrating a format of stream data generated according to the MPEG standard or the like.

With reference to FIG. 4, stream data 105 generated by the first signal generator 101 comprises a plurality of successive frames. A sync preamble, in which the type of data, the length of data, etc. are described, is placed at the beginning of each frame, and this sync preamble is used for frame identification or the like by a decoder.

FIG. 5 shows the time charts of the respective signals outputted from the conventional digital signal processor when the processor receives an audio switching instruction from the viewer while a DVD player or the like is playing a disk. In FIG. 5, the same reference numerals as those shown in FIG. 3 denote the same or corresponding parts.

In FIG. 5, T3 denotes a point of time at a boundary of periods of the stream data 105 (i.e., a boundary of two frames), and "last a" is the last data in a frame while "head b" is the first data in the next frame. Further, the second signal generator 102 does not generate audio data 106 during a no-signal output period B, and it starts to generate "head c" as the head data of the audio data 106 at time T4.

Hereinafter, the operation of the conventional digital signal processor will be described using FIGS. 3 and 5.

At time T1, the first signal generator 101 generates stream data 105 and outputs it. The signal switching unit 103 is connected to the first signal generator 101, and outputs the stream data 105 supplied from the first signal generator 101. At this point of time, the second signal generator 102 has not yet started generation of audio data 106.

When there is a switching instruction from the viewer at time T2, the signal switching controller 104 outputs a switching instruction signal 107. According to the switching instruction signal 107 from the signal switching controller 104, the signal switching unit 103 switches the connection from the first signal generator 101 to the second signal generator 102. However, since the second signal generator 102 has not yet started generation of audio data 106 at this point of time, the signal 108 outputted from the signal switching unit 103 is invalid data.

At time T4, the second signal generator 102 starts to generate audio data 106 and, simultaneously, "head c" of the audio data 106 is output from the signal switching unit 103.

As described above, when there is a switching instruction from the viewer at some point in a period of the stream data 105 outputted from the signal switching unit 103, the output of signal switch unit 103 is immediately switched from the output of the first signal generator 101 to the output of the second signal generator 102 and, consequently, the latter part of the frame in the stream data 105 including "last a" is not output from the signal switching unit 103, resulting in a lag time A due to the switching.

Further, during the period from when the output of the signal switching unit 103 is switched from the output of the first signal generator 101 to the output of the second signal generator 102 to when the second signal generator 102 starts to generate audio data 106, the output signal 108 from the signal switching unit 103 is invalid data, and a time lag occurs during this period.

As described above, when the conventional digital signal processor receives an audio switching instruction from the viewer while the DVD player is playing the disk, the signal processor switches its output to the audio data during a period of the stream data and, furthermore, it outputs the stream data from some point in the period when switching the audio data to the stream data.

Therefore, when a digital AV amplifier with a built-in decoder (not shown) as a peripheral device of the DVD player receives a frame which lacks a part of the sync preamble, the digital AV amplifier continues to reproduce the stream data as audio data until it detects the sync preamble of the next frame, and this causes noise.

Furthermore, if the output level of the audio data is high when switching the output between the audio data and the stream data, a shock sound occurs. Further, if generation of data to be output after the output switching is not started yet by the time of the output switching, a pause occurs between the played audio data, and the audio is interrupted for a moment. Thus, the noise generated at the audio switching grates on the viewer's ear, and makes the user uncomfortable.

In order to prevent such malfunction of the decoder and occurrence of noise and shock sound at the audio output switching, when the viewer wants to change the output audio while viewing the DVD video, he/she must stop the operation of the DVD player for a time to change the audio and then resume playback of the disk, resulting in lack of convenience.

SUMMARY OF THE INVENTION

The present invention is made to solve the above-described problems and has for its object to provide a digital signal processor which is able to switch audio output even when a DVD player or the like is playing a disk.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a first aspect of the present invention, there is provided a digital signal processor for switching its output between plural digital audio data according to an output switching instruction from the outside. This digital signal processor comprises a coded audio data generation unit for generating coded audio data; an audio data generation unit for generating audio data; a signal switching unit for outputting one of the coded audio data and the audio data respectively supplied from the coded audio data generation unit and the audio data generation unit, and switching the output between these data; and a signal switching control unit for detecting the periodicity of the coded audio data outputted from the coded audio data generation unit, and controlling the signal switching unit so as to switch the output at the boundary of periods of the coded audio data. Therefore, when a DVD player including this digital signal processor receives an output switching instruction from the viewer during playback of a disk, the DVD player can supply a decoder with the coded audio data for which periodicity is ensured, thereby avoiding malfunction of the decoder and occurrence of noise. Accordingly, audio output switching operation, which has conventionally been performed only when the operation of the DVD player is suspended, can be performed also when the disk is being played, whereby the viewer can easily switch the audio while watching the video, resulting in improved convenience.

According to a second aspect of the present invention, in the digital signal processor of the first aspect, the signal switching control unit controls the coded audio data generation unit or the audio data generation unit so that generation of coded audio data or audio data, which is to be output after the output switching, is started simultaneously with the output switching of the signal switching unit. Therefore, smoothly continued audio can be output without interruption at audio switching.

According to a third aspect of the present invention, in the digital signal processor of the first or second aspect, the audio data generation unit performs soft muting on the audio data so as to gradually reduce the output level of the audio data, immediately before the output from the signal switching unit is switched from the audio data to the coded audio data, and it performs muting on the audio data when the output from the signal switching unit is switched from the coded audio data to the audio data and, thereafter, gradually increases the audio output level. Therefore, a shock sound is prevented from occurring at audio switching, resulting in smoothly continued audio.

According to a fourth aspect of the present invention, there is provided a digital signal processor for switching its output between plural digital audio data according to an output switching instruction from the outside. This digital signal processor comprises a first coded audio data generation unit for generating first coded audio data; a second coded audio data generation unit for generating second coded audio data; a signal switching unit for outputting one of the first and second coded audio data respectively supplied from the first and second coded audio data generation units, and switching the output between these data; and a signal switching control unit for controlling the output switching of the signal switching unit. In this digital signal processor, on receipt of the output switching instruction from the outside, said signal switching control unit detects the periodicity of the first or second coded audio data outputted from the signal switching unit, and controls the signal switching unit so as to switch the output when a period of the coded audio data is ended and, simultaneously, controls the first or second coded audio data generation unit so as to generate data to be output after the output switching, from the beginning of a period of the data. Therefore, when a DVD player including this digital signal processor receives an output switching instruction from the viewer during playback of a disk, the DVD player can supply a decoder with the first and second coded audio data for which periodicity is ensured, thereby avoiding malfunction of the decoder and occurrence of noise. Accordingly, audio output switching operation, which has conventionally been performed only when the operation of the DVD player is suspended, can be performed also when the disk is being played, whereby the viewer can easily switch the audio while watching the video, resulting in improved convenience.

According to a fifth aspect of the present invention, there is provided a digital signal processor for switching its output between plural digital audio data, according to an output switching instruction from the outside. The digital signal processor comprises a plurality of signal generation units for generating plural pieces of digital data, respectively; a signal switching unit for outputting one of the plural pieces of digital data supplied from the signal generation units, and switching its output; and a signal switching control unit for controlling the timing of output switching of the signal switching unit. In the digital signal processor, periodical coded data is output from the signal switching means, and when the signal switching control unit receives an output switching instruction from the outside, it controls the signal switching unit so that output switching is performed at the time when a period is ended. When the signal switching unit switches its output data to the coded data, the signal switching control unit controls the signal generation unit so that the coded data is generated from the beginning of the period, simultaneously with the output switching. Therefore, the coded audio data with assured periodicity can be supplied to a decoder, whereby malfunction of the decoder and occurrence of noise are avoided.

BRIEF DESCRIPTION OF THE DRAWINGS

FIG. 2 shows time charts of output signals from the digital signal processor according to the first embodiment when it receives an audio switching instruction from the viewer during playback of a disk by a DVD player or the like.

FIG. 5 shows time charts of output signals from the conventional digital signal processor when it receives an audio switching instruction from the viewer during playback of a disk by a DVD player or the like.

DETAILED DESCRIPTION OF THE PREFERRED EMBODIMENTS

[Embodiment 1]

Hereinafter, a digital signal processor according to a first embodiment of the present invention will be described with reference to FIGS. 1 and 2.

Figure 1:
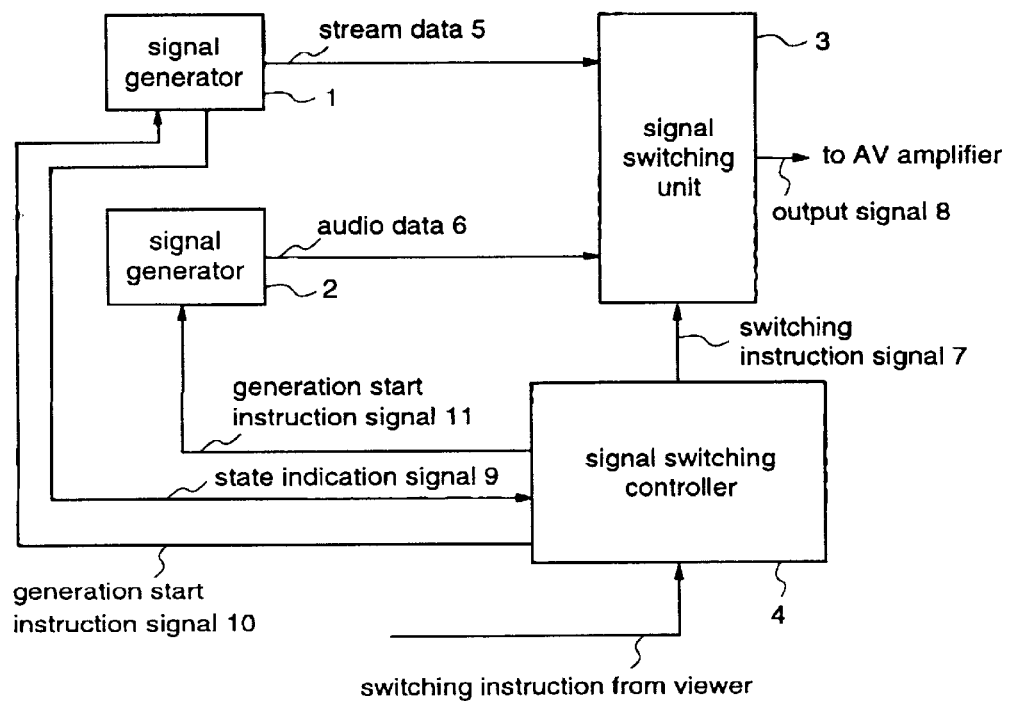
FIG. 1 is a block diagram illustrating the structure of a digital signal processor according to a first embodiment of the invention.

FIG. 1 is a block diagram illustrating the structure of a digital signal processor according to the first embodiment of the invention.

In FIG. 1, reference numeral 1 denotes a first signal generator which generates stream data 5 according to a standard such as MPEG, DolbyAC-3, DTS, or the like, and transmits the stream data 5 serially; numeral 2 denotes a second signal generator which generates audio data 6, and transmits the audio data 6 serially; numeral 3 denotes a signal switching unit which outputs either the stream data 5 supplied from the first signal generator 1 or the audio data 6 supplied from the second signal generator 2, and switches the output; and numeral 4 denotes a signal switching controller which receives a switching instruction from the viewer, and outputs a switching instruction signal 7.

In contrast with the conventional digital signal processor, the first signal generator 1 of this first embodiment outputs a state indication signal 9 to the signal switching controller 4, thereby continuously presenting where the stream data 5 being currently outputted from the generator 1 is positioned in the period.

Further, the signal switching controller 4 receives the state indication signal 9 from the first signal generator 1, and controls the timing to output the switching instruction signal 7 to the signal switching unit 3, and notifies the first and second signal generators 1 and 2 of the signal switch timing, thereby controlling the operations of these generators.

Figure 2:
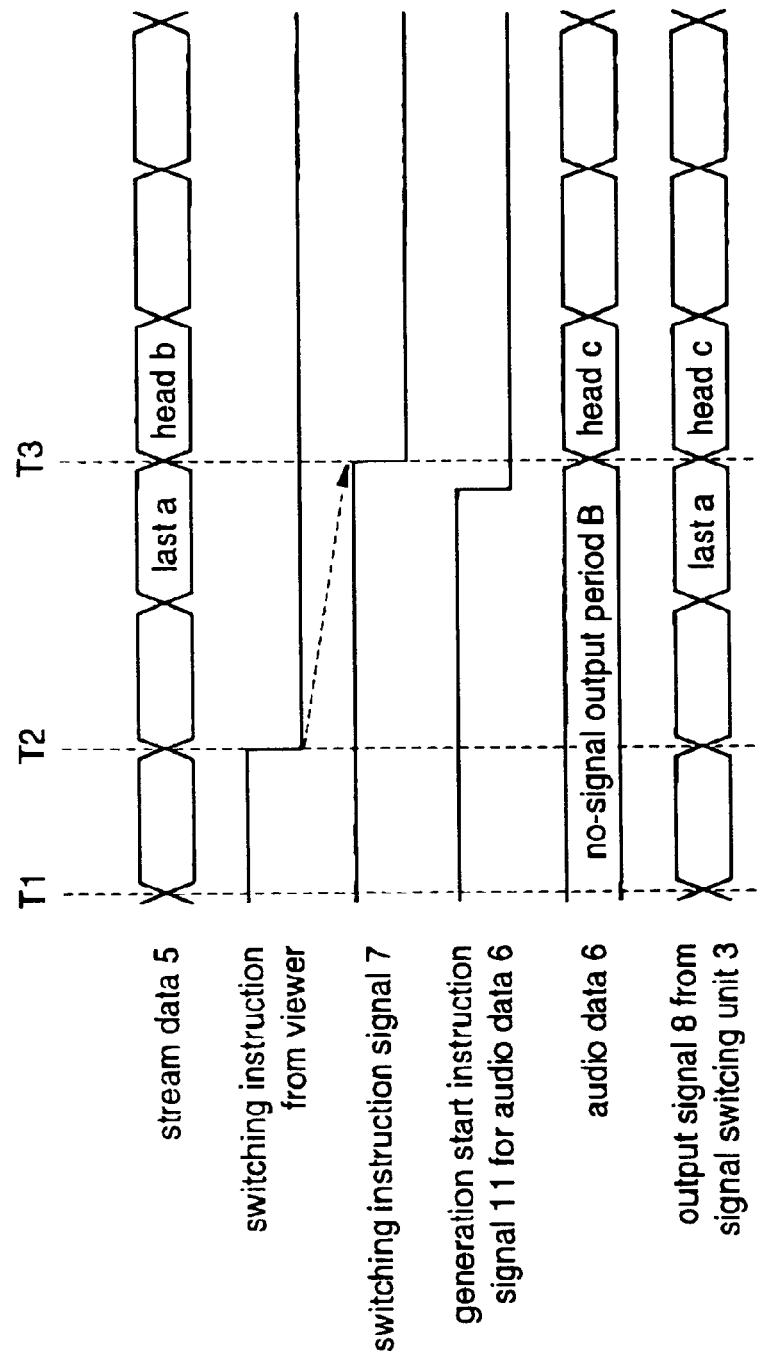
Figure 3:
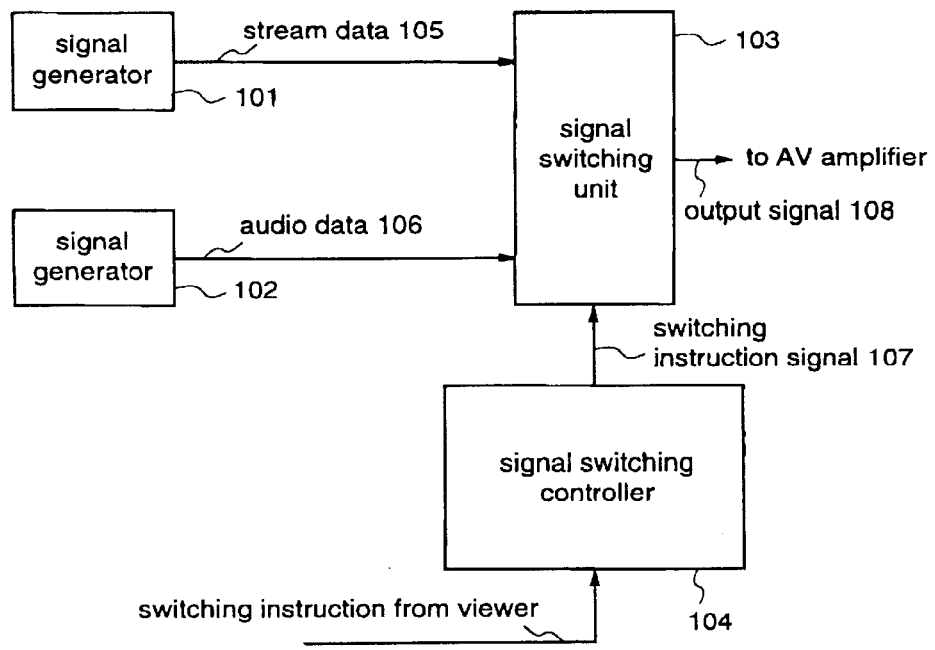
FIG. 3 is a block diagram illustrating the structure of the conventional digital signal processor.
Figure 4:
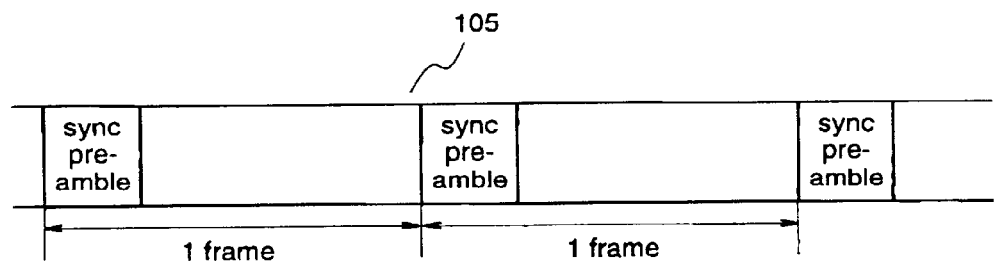
FIG. 4 is a diagram illustrating the format of stream data according to MPEG standard.
Figure 5:
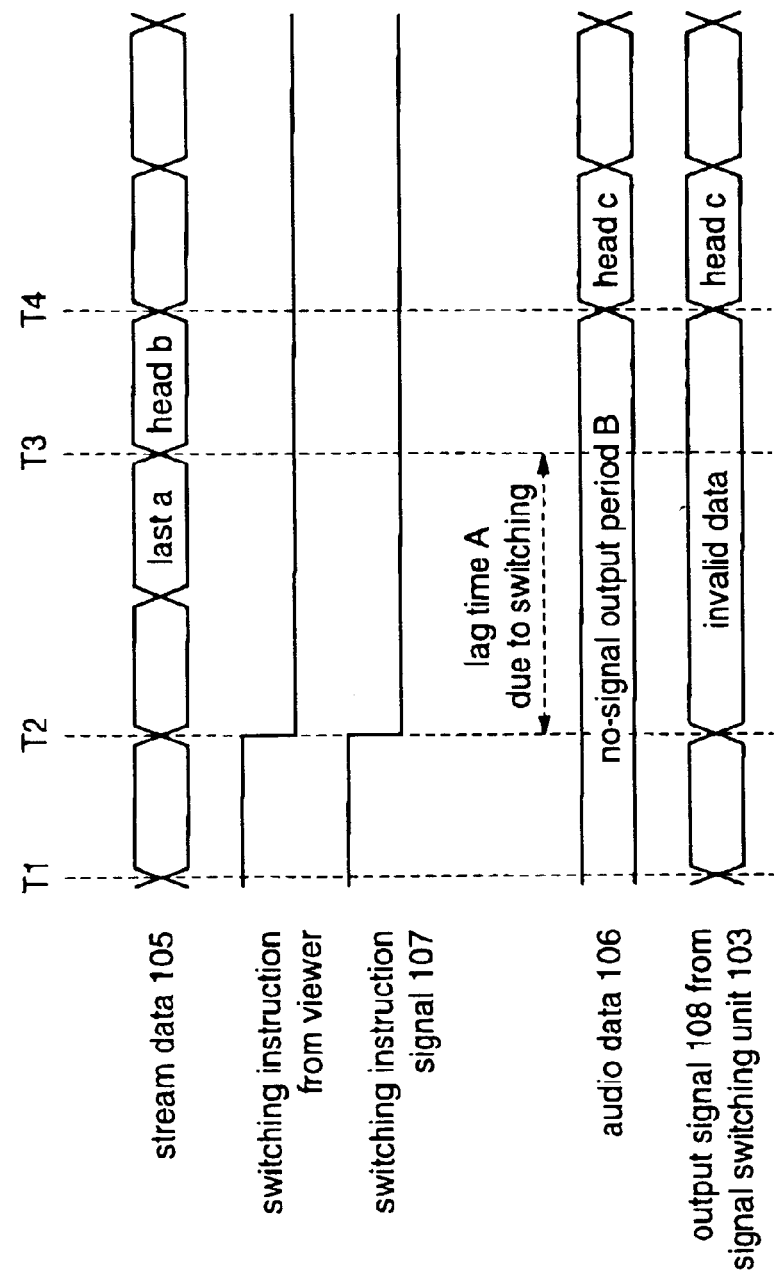

FIG. 2 shows time charts of the respective signals outputted from the digital signal processor of the first embodiment when it receives an audio switching instruction from the viewer during playback of a disk by a DVD player or the like. In FIG. 2, the same reference numerals as those shown in FIG. 1 denote the same or corresponding parts.

With reference to FIG. 2, T3 indicates a point of time at the boundary of periods of the stream data 5 (i.e., the boundary of two frames), and "last a" indicates the last data in a frame while "head b" indicates the first data in the next frame. Further, the second signal generator 2 generates no audio data 6 during a no-signal output period B, and it starts to generate "head c" as the head data of the audio data 6 at time T3.

Hereinafter, the operation of the digital signal processor of this first embodiment will be described with reference to FIG. 2.

First of all, at time T1, the first signal generator 1 generates stream data 5 and outputs it. The signal switching unit 3 is connected to the first signal generator 1, and outputs the stream data 5 supplied from the first signal generator 1. Further, the second signal generator 2 has not yet started generation of audio data 6 at time T1.

When there is a switching instruction from the viewer at time T2, the signal switching controller 4 outputs a switching instruction signal 7 not immediately but at time T3 when it detects the end of a period of the stream data 5 according to a state indication signal 9 supplied from the first signal generator 1. The signal switching unit 3 receives the instruction signal 7 from the controller 4, and switches the connection from the first signal generator 1 to the second signal generator 2. Thereby, the stream data 5 is output, up to the end of the period, from the signal switching unit 3, regardless of the timing of the switching instruction from the viewer.

Further, the signal switching controller 4 outputs an instruction signal 11 for starting signal generation (hereinafter, referred to as "a generation start instruction signal") to the second signal generator 2 just before time T3 at which it outputs a switching instruction signal 7 to the signal switching unit 3. On receipt of the generation start instruction signal 11, the second signal generator 2 starts to generate audio data 6, and mutes the audio data 6 outputted simultaneously to reduce the audio output level and, thereafter, gradually increases the audio output level.

Furthermore, when performing output switching from the audio data 6 to the stream data 5 on receipt of an audio switching instruction from the viewer, the signal switching controller 4 adjusts the timing of output switching by the signal switching unit 3 to the timing at the boundary of periods of the stream data 5 outputted from the first signal generator 1, and the second signal generator 2 performs, just before the output switching, soft muting on the audio data 6 so as to gradually reduce the audio output level. Thereby, the stream data 5 including the sync preamble at its head is output when the signal switching unit 3 switches the output.

As described above, according to the digital signal processor of the first embodiment, since the digital audio interface is used in the path from an apparatus equipped with the signal processor to an apparatus equipped with a decoder such as a digital AV amplifier, even when the stream data 5 is switched to the audio data 6, the stream data 5 with assured periodicity is transmitted to the decoder connected, whereby malfunction of the decoder due to errors in transmitted data is avoided. Further, also when switching the audio data 6 to the stream data 5, since the stream data 5 is supplied from the beginning of a period, the decoder can recognize the data for identifying the stream data 5, which is stored at the beginning of the period of the stream data 5. Thereby, noise, which is caused by that the stream data 5 is reproduced as audio data although it is not audio data, is prevented from occurring.

Furthermore, since the audio output level is temporarily reduced by muting the audio data 6 when switching the output between the stream data 5 and the audio data 6, no shock sound occurs at the audio switching, resulting in smoothly continued audio.

Furthermore, when switching the output between the stream data 5 and the audio data 6, the first and second signal generators 1 and 2 are controlled so as to generate data to be output after the output switching. Therefore, the audio is prevented from being interrupted at the audio switching, resulting in smoothly continued audio.

Moreover, the inter-switching between the stream data 5 and the audio data 6 is applicable to, for example, the case where there is an instruction from the user to switch the output between the stream data 5 and audio data 6 to the digital audio interface when playing the same audio. Alternatively, when two kinds of audio data, e.g., MPEG audio data (first audio) and linear PCM data (second audio), are recorded on the same track of a DVD, although the MPEG data is stream data, the linear PCM data is audio data itself and has no stream data. Therefore, when the user changes the audio on the track from the first audio to the second audio, the output from the player to the digital audio interface must be automatically switched from the stream data 5 to the audio data 6. Also in this case, the present invention is applicable. Furthermore, even when the stream data 5 exists in both of the first audio and the second audio, since these data are different data, the periodicity of each data must be ensured. Also in this case, the present invention is applicable. According to the present invention, it is possible to perform, during disk playback, output switching between the stream data 5 and the audio data 6 to the digital audio interface, which has conventionally been performed only when playback is halted, and furthermore, it is possible to perform, during playback, inter-switching between two kinds of audio data recorded on the same track, thereby offering high convenience to the user.

Accordingly, for example, the audio output switching operation, which has conventionally been performed only when the DVD player is halted, can be performed even when the DVD player is playing the disk, and the viewer can easily switch the audio from Japanese (first audio) to another language (second audio), while watching the video.

Furthermore, as another example, when a digital TV tuner or the like selects a station (channel), malfunction of a decoder, which is caused by errors in transmission data, is avoided. Further, occurrence of noise, which is caused by reproduction of stream data as audio data by mistake, is also avoided. Therefore, when the digital TV tuner or the like performs channel switching, it can output a stream to the digital audio interface, which has conventionally been impossible.

What is claimed is:

1. A digital signal processor for switching its output between plural digital audio data, according to an output switching instruction, comprising:
    a coded audio data generation unit operable to generate coded audio data;
    an audio data generation unit operable to generate audio data;
    a signal switching unit operable to output one of the coded audio data and the audio data respectively supplied from the coded audio data generation unit and the audio data generation unit, and operable to switch the output between these the coded audio data and the audio data; and
    a signal switching control unit operable to detect a position of the coded audio data within a period of the coded audio data generated by the coded audio data generation unit, and operable to receive the output switching instruction,
    wherein, upon receipt of the output switching instruction, the signal switching control unit detects the position of the coded audio data within the period and controls the signal switching unit to switch the output between the coded audio data and the audio data at the conclusion of the period.

2. The digital signal processor of claim 1, wherein said signal switching control unit controls the coded audio data generation unit or the audio data generation unit so that the generation of coded audio data or audio data, which is to be output after the signal switching unit switches the output between the coded audio data and the audio data, is started simultaneously with the signal switching unit switching the output between the coded audio data and audio data.

3. The digital signal processor of claim 2,
    wherein said audio data generation unit performs soft muting on the audio data so as to gradually reduce the output level of the audio data, immediately before the output from the signal switching unit is switched from the audio data to the coded audio data; and
    performs soft muting on the audio data when the output from the signal switching unit is switched from the coded audio data to the audio data and, thereafter, gradually increases the audio output level.

4. The digital signal processor of claim 1,
    wherein said audio data generation unit performs soft muting on the audio data so as to gradually reduce the output level of the audio data, immediately before the output from the signal switching unit is switched from the audio data to the coded audio data; and
    performs soft muting on the audio data when the output from the signal switching unit is switched from the coded audio data to the audio data and, thereafter, gradually increases the audio output level.

5. The digital signal processor according to claim 1, wherein the signal switching control unit is operable to detect the end of the period of the coded audio data generated by the coded audio data generation unit based on a state indication signal supplied from the coded audio data generation unit.

6. The digital signal processor according to claim 1, wherein the signal switching control unit sends a start instruction signal to one of the coded audio data generation unit and the audio data generation unit before the signal switching control unit instructs the signal switching unit to switch the output between the coded audio data and the audio data.

7. A digital signal processor according to claim 1, wherein the output switching instruction is generated by a user.

8. A digital signal processor for switching its output between plural digital audio data, according to an output switching instruction comprising:
    a first coded audio data generation unit operable to generate first coded audio data;
    a second coded audio data generation unit operable to generate second coded audio data;
    a signal switching unit operable to output one of the first and second coded audio data respectively supplied from the first and second coded audio generation units, and operable to switch the output between the first and second coded audio data; and
    a signal switching control unit operable to control the signal switching unit switching the output between the first and second coded audio data and operable to receive the output switching instruction;

wherein, upon receipt of the output switching instruction, said signal switching control unit detects a position of the first or second coded audio data within a period of the first or second coded audio data output from the signal switching unit, and controls the signal switching unit so as to switch the output between the first and second coded audio data when the period of the first coded audio data ends.

9. The digital signal processor according to claim 8, wherein the signal switching control unit is operable to detect the end of the period of the first coded audio data generated by the first coded audio data generation unit based on a state indication signal supplied from the first coded audio data generation unit.

10. The digital signal processor according to claim 8, wherein the signal switching control unit sends a start instruction signal to one of the first coded audio data generation unit and the second coded audio data generation unit before the signal switching control unit instructs the signal switching unit to switch the output between the first coded audio data and the second coded audio data.

11. A digital signal processor according to claim 8, wherein the signal switching control unit controls the first or second coded audio data generation units so that the generation of first or second coded audio data, which is to be output after the signal switching unit switches the output between the first and second coded audio data, is started simultaneously with the signal switching unit switching the output between the first and second coded audio data.

12. A digital signal processor according to claim 8 wherein the output switching instruction is generated by a user.

13. A digital signal processor for switching its output between plural digital audio data, according to an output switching instruction, comprising:

a first signal generation unit operable to generate first digital data, at least one second signal generation unit operable to generate second digital data;

a signal switching unit operable to output one of the of first and second digital data supplied from the first and second signal generation units, and operable to switch the output between the first and second digital data; and a signal switching control unit operable to control the timing of switching the output of the signal switching unit between the first and second digital data;

wherein the signal switching unit outputs periodic data, and when the signal switching control unit receives an output switching instruction, the signal switching control unit detects a position of the periodic data within a period and controls the signal switching unit to switch the output of the signal switching unit at a time when the period of the periodic data has ended.

14. The digital signal processor according to claim 13 wherein the signal switching control unit is operable to detect the end of the period of the periodic data based on a state indication signal supplied from the first signal generation unit.

15. The digital signal processor according to claim 13, wherein the signal switching control unit sends a start instruction signal to one of the first signal generation unit and the at least one second signal generation unit before the signal switching control unit instructs the signal switching unit to switch the output between the first and second digital data.

16. A digital signal processor according to claim 13 wherein the signal switching control unit controls the first signal generation unit or the at least one second signal generation unit so that the generation of first or second digital data, which is to be output after the signal switching unit switches the output between the first and second digital data, is started simultaneously with the signal switching unit switching the output between the first and second digital data.

17. A digital signal processor according to claim 13 wherein the output switching instruction is generated by a user.

18. A digital signal processing method for switching its output between plural digital audio data, comprising:

receiving an output switching instruction at a signal switching control unit;

detecting a position of coded audio data within a period of coded audio data output by a coded audio data generation unit upon receipt of the output switching instruction;

outputting a switching signal to a signal switching unit at the conclusion of the period; and switching the output of the signal switching unit between the coded audio generated by the coded audio data generation unit and audio data generated by an audio data generation unit based on the switching signal.

19. A digital signal processing method for switching its output between plural digital audio data, comprising:

receiving an output switching instruction at a signal switching control unit;

detecting a position of coded audio data within a period of coded audio data output by a first coded audio data generation unit upon receipt of the output switching instruction;

outputting a switching signal to a signal switching unit at the conclusion of the period; and switching the output of the signal switching unit between the coded audio generated by the first coded audio data generation unit and coded audio data generated by a second coded audio data generation unit based on the switching signal.

* * * * *